Aug. 29, 1961

E. E. HUPP 2,997,850

POWER OPERATED HYDRAULIC ACTUATOR

Original Filed Nov. 12, 1953

INVENTOR.
EDWARD E. HUPP
BY Cecil J Avens

ATTORNEY

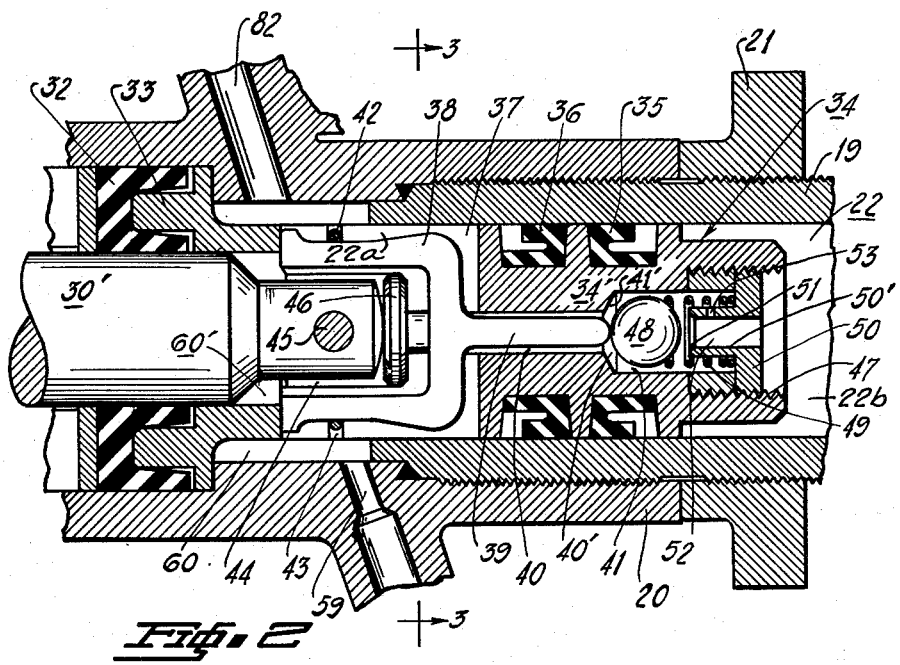
Fig. 2
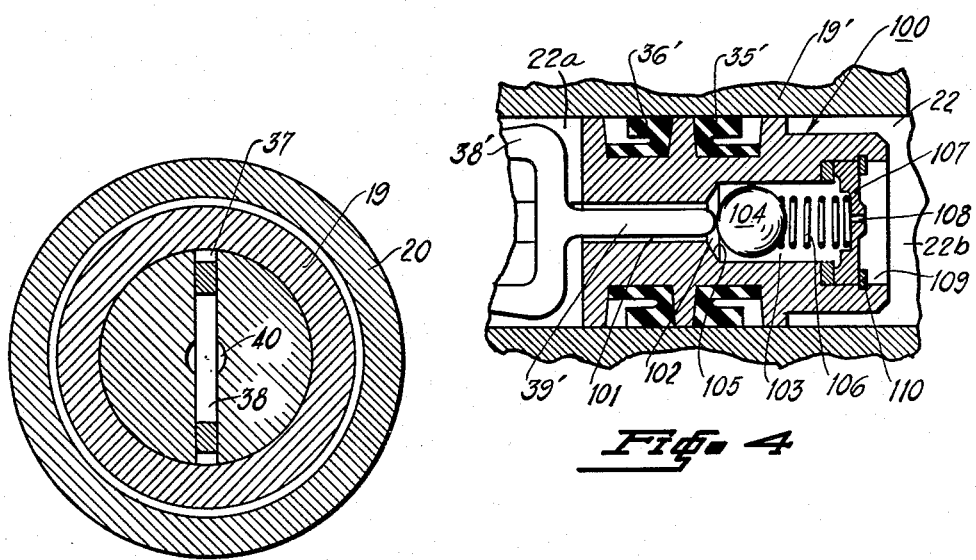
Fig. 3
Fig. 4
INVENTOR.
EDWARD E. HUPP
BY
ATTORNEY

United States Patent Office 2,997,850
Patented Aug. 29, 1961

2,997,850
POWER OPERATED HYDRAULIC ACTUATOR
Edward E. Hupp, South Bend, Ind., assignor to The Bendix Corporation, a corporation of Delaware
Continuation of application Ser. No. 391,468, Nov. 12, 1953. This application Sept. 22, 1959, Ser. No. 841,662
11 Claims. (Cl. 60—54.5)

This invention relates to combined manual and power-assisted hydraulic braking systems for vehicles and is primarily concerned with systems of the low-input, high-output type utilizing an air-differential power booster. What has come to be known as a low input system has, in effect, a high displacement output side which includes the slave cylinder or power-operated master cylinder, the brake cylinders or motors, and the hydraulic fluid lines which connect said cylinders or motors to the power operated master cylinder; and a low displacement input side which includes the manually-operated master cylinder, a hydraulically-operated device for operating the booster control valve, and a follow-up variable-volume chamber which is in hydraulic communication with the manually-operated master cylinder and said device and increases in volume as the booster-operated master cylinder piston advances on its power stroke to displace fluid in the power operated master cylinder. The present application is a continuation of my copending application Serial Number 391,468, filed November 12, 1953, now abandoned.

Low input systems have the advantages of (1) standardization in size of the manually-operated master cylinder, (2) short travel of the brake pedal or treadle, and (3) relatively light pedal pressure.

Since the fluid capacity of the input side is limited, it is important to minimize displacement of fluid from the input to the output side during the braking operation with power assistance, otherwise the brake pedal or treadle may be "bottomed" before the brakes are fully applied, while at the same time provision should be made to permit relatively free displacement of fluid from the input to the output side in the event power failure or disablement of the booster unit requires full manual braking. To permit such displacement for full manual braking and to also compensate for changes in volume of the hydraulic fluid in the system, a port or passage is usually provided through or across the power operated master cylinder piston, which port or passage is "sealed off" or closed when the piston is advanced into the master cylinder during a power stroke of the booster. This sealing off of the input side of the system from the output side presents a problem in that it is tied in with control valve operation. While under normal braking conditions, initial displacement of fluid in the manually operated master cylinder may cause the control valve to effect a power stroke of the booster with sufficient promptness for all practical purposes, there are times when the brake pedal is depressed with such rapidity and force as to build up pressures in the input side greatly in excess of those required to operate the control valve, so that there is a tendency to displace fluid across the power operated master cylinder piston before the inertia, friction and other factors which cause lag of the booster can be overcome.

An object of the present invention, therefore, is to provide an efficient combined manual and power-assisted hydraulic braking system of the low input type in which the desired ratio of input to output volume displacement is maintained under varying conditions of operation.

Another object is to provide in a combined manual and power-assisted hydraulic braking system of the low input type means for ensuring prompt control valve operation and booster response with a minimum displacement of fluid from the input to the output side of the system.

Another object is to provide in a power operated hydraulic braking system means permitting standardization of design of the power booster irrespective of variations in required or specified brake cylinder or motor operating pressures.

A further object is to provide in a low input combined manual and power-assisted hydraulic braking system a power operated master cylinder piston and associated valving designed to maintain the desired ratio of input to output volume displacement with effective control valve operation for the power booster while at the same time permitting manual braking when the power unit is incapacitated.

The foregoing and other objects and advantages will become apparent in view of the following description taken in conjunction with the accompanying drawings, wherein:

FIGURE 2 is an enlargement of the piston construction of the slave cylinder and associated parts of FIGURE 1;

FIGURE 3 is a section taken substantially on the line 3—3 of FIGURE 2;

FIGURE 4 is a view similar to FIGURE 2 of an alternate type of slave cylinder piston and coacting valve assembly; and FIGURE 5 is an enlarged view of the fluid compensating valve assembly.

Figure 1:
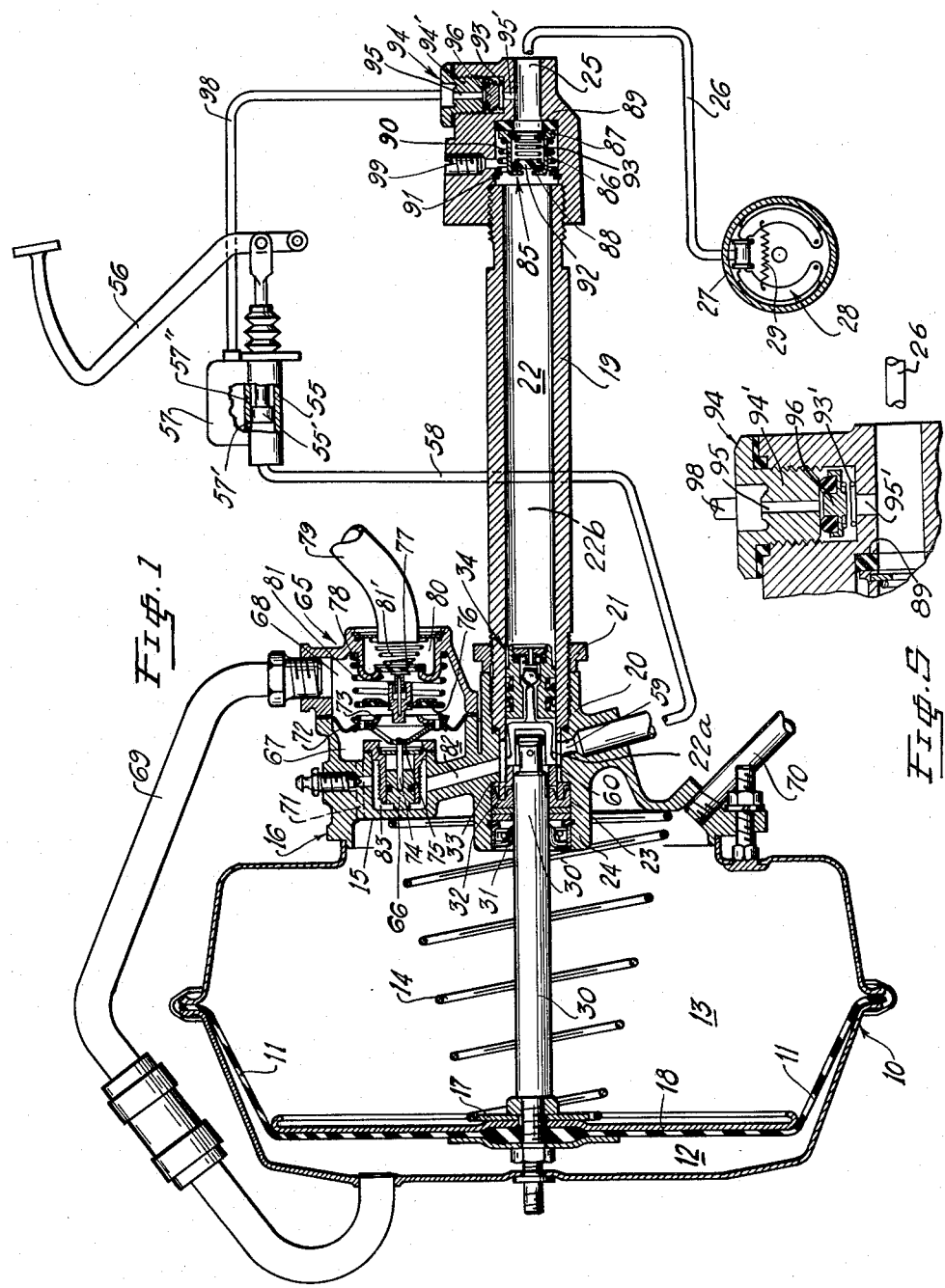
FIGURE 1 is a substantial central longitudinal section of an embodiment of the invention, with connections to a vehicle brake and manually operated master cylinder shown in schematic diagram.

Referring to FIGURE 1 of the drawings, the power unit comprises a housing 10, having a fluid pressure-responsive member or movable wall therein, which constitutes a power piston and in the present instance is shown as a diaphragm 11, clamped at its peripheral edge between mating sections of the housing and together with the latter defining variable volume chambers 12 and 13. The diaphragm 11 is maintained in its retracted or released position by a spring 14, the one end of said spring abutting the adjacent wall 15 of housing 16 and its opposite or reduced end encircling a centering washer 17 and abutting a diaphragm-stiffening plate 18. The housing 16 provides a support for a power operated master cylinder 19, which at its inner or left-hand end is threaded into a hollow boss or projection 20, formed on the housing 16, and is secured in sealed position by nut 21 with its bore 22 in alignment with a bore 23, formed in an inward extension 24 of the hollow boss 20. At its outer free end, the master cylinder 19 is provided with a port 25, to which is connected fluid line 26, leading to the brake cylinders or motors of the vehicle braking system, one of such cylinders or motors being shown at 27 in operative association with a brake assembly, generally indicated at 28, including retraction spring 29.

A connecting or push rod 30 is suitably secured at its left-hand extremity to the central portion of the diaphragm 11 and at its opposite extremity 30' projects through a seal essembly 31, double-acting seal ring 32 and seal retainer and bushing 33, into the bore 23. The bushing and retainer 33 also function as a stop or abutment as will subsequently appear. A master cylinder piston, generally indicated at 34 and shown enlarged in Figure 2, is mounted on the right-hand end 30' of rod 30 for sliding or reciprocating movement in the bore 22 of the said cylinder. The piston 34 divides the cylinder bore 22 into an input chamber 22a and an output chamber 22b, the latter chamber communicating with the discharge port 25. Piston 34, in the form shown in Figures 1 and 2, comprises a cylindrical piston head or piston proper 34', formed with a pair of annular grooves for reception of reversely-disposed, double-acting seals 35 and 36. At its rear or left-hand end, the piston is formed with a diametric slot 37, which is open toward the rear of the piston for insertion of a valve-unloader, here shown as a yoke-shaped member 38, formed with a plunger 39, projecting through a bore 40, which terminates in a port 40', opening into valve chamber 41. A valve seat 41' surrounds the port 40'. The yoke 38 is held against lateral displacement by a split snap ring 42, adapted to be received in an annular groove 43. The piston construction and coacting yoke-shaped valve unloader arrangement so far described is generally similar to that disclosed in Patent No. 2,536,461, issued January 2, 1951, to Earl R. Price.

At its right-hand end 30' the connecting rod 30 is reduced in diameter and is received in an opening 44, formed in the rear end of the piston 34, a pin 45 serving to connect the rod to the piston for the return stroke. The snap ring 42 which retains the yoke in position also holds the pin 45 in place. The thrust of rod 30 on the power stroke is taken by a plug 46.

The front end of the piston 34 is provided with an internally screw-threaded opening 47, to accommodate a valve assembly including a valve closure member shown in the form of a ball 48, spring 49 and insert 50, the latter having a central tubular portion 50', formed with a valve seat 51, a port or passage 52 and a small by-pass orifice 53. Since the function of this valve assembly will be set forth in the description of operation it will suffice at this time to point out that the size of this orifice is such that it facilitates a rapid pressure build-up in chamber 60 to operate control valve 65 before the pressure in bore 22 has become great enough to unseat valve member 92. The size of the orifice 53 will, of course, vary with the preloading of the spring 93, remembering also that the orifice must be of such a size as to pass an adequate amount of fluid for manual braking upon failure of the power booster. The low input system comprises a manually operated master cylinder 55, having the usual piston 55' therein, which in this instance is manually operable by a brake pedal 56. A reservoir 57 is shown mounted on the master cylinder and is adapted to communicate with the latter by way of compensating port 57' and recuperation port 57''. A fluid line 58 connects the master cylinder 55 with input port 59, the latter feeding into an annular chamber 60, from which it is free to pass into slot 37 and chamber 60', and also into passage 82 for actuating a booster control valve 65 in a manner to be described. When the parts of the brake system are in released position, as shown in Figures 1 and 2, with yoke 38 abutting bushing 33 and holding ball valve 48 off its seat 41, fluid may pass from the input to the output side of the system, or vice versa, by way of slot 37, bore 40, chamber 41, and passage 52. In its fully retracted position it will be noted that the extremity 30' of the connecting rod 30 is maintained contiguous the bushing 33. As the end 30' of the rod 30 is moved into the chamber 60' it occupies the greater part of the total volume of this chamber thus minimizing the total fluid displacement from the master cylinder 55.

The control valve for selectively varying the differential pressure across the power cylinder diaphragm 11 is generally indicated at 65 and is operatively connected to the chamber 60 to respond to the pressure therein; the control valve includes a valve operating piston 66, a vacuum chamber 67, and a control chamber 68. A conduit 69 affords communication between the control chamber 68 and the power cylinder chamber 12, and a conduit 70 provides a connection from a source of vacuum or other suitable low pressure source (not shown) with the chamber 13 of the power cylinder and thence by way of passage 71 with the vacuum chamber 67 of the control valve 65. A diaphragm 72 is mounted between chamber 67 and 68, said diaphragm carrying a valve seat 73, which together with the diaphragm is connected to the piston 66 by means of stem 74 and member 75, the latter being of open-work construction in order not to block communication between the chambers 67 and 68 through the opening or port defined by the valve seat 73. A pair of poppet valves 76 and 77 are connected for movement in unison, the valve 77 being adapted to engage a seat 78, defining an opening or port which, when valve 77 is unseated, affords communication of atmospheric pressure by way of conduit 79 and chamber 80 with chamber 68 and conduit 69. A return spring 81 normally urges the valve seat 73 to unseated position with the diaphragm 72 and piston 66 to the left as shown in FIGURE 1; and another spring 81' normally urges atmospheric valve 77 to closed position on seat 78. Passage 82 connects chamber 60 of the low input side of the system to chamber 83 in which the piston 66 is mounted.

At the discharge end of the master cylinder 22 is a double-acting or two-way check valve assembly, generally indicated at 85, which combines the functions of the usual brake residual pressure check valve and what may be arbitrarily termed an "escape pressure valve," since it elevates to within a predetermined range the pressure required to displace fluid from the master cylinder into the brake lines and cylinders or motors, for a purpose to be described. The valve assembly 85 comprises a cup-shaped member 86, formed with reversely turned flanges at its opposite ends, the out turned flange at its rear or right-hand end providing a movable valve member 87 and the inturned flange at its opposite end providing a valve seat 88. Valve member 87 is adapted to engage a valve seat 89 and is normally urged to seated position by a spring 90, which at one end bears against the valve member 87 and at its opposite end abuts a ring 91. Valve member 87 and seat 89 constitute a residual check valve. The interior of the cup-shaped member 86 has slidably mounted therein a valve member 92, adapted to engage the seat 88 and normally urged to seated position by a spring 93. The pressure acting on a given area of valve member 92 required to unseat the same and displace fluid from the master cylinder chamber 22 into the brake motor system is determined by the seating force of spring 93 plus the force required to initiate movement of the brake shoes against the resistance of the brake return springs 29.

To illustrate an important function served by the escape pressure valve 92, let it be assumed that it requires a minimum of 50 p.s.i. to operate the control valve piston 66 to cause movement of the push rod 30 and closure of the check ball valve 48; also that it requires a pressure of 15 p.s.i. to expand the brake cylinders or motors against the resistance of the brake return springs 29. To ensure against displacement of fluid from the master cylinder 19 and hence from the input to the output side of the system across the piston 34, before the control valve establishes a differential across the power piston or diaphragm 11 sufficient to overcome inertia and friction of the parts and advance the same to a point where the ball valve 48 closes passage 40, the valve 92 would require a spring load to produce the equivalent of at least 35 p.s.i. If, however, the valve 92 were loaded by a spring which produces 45 p.s.i., there would be a range of ten pounds for variation in brake operating pressures while still maintaining a lower limit on booster operating pressures.

To compensate for changes in volume of fluid in the brake system beyond the valve 85, an auxiliary compensating system is provided and comprises a valve assembly, generally indicated at 94, including a plug 94', formed with a passage 95, which is controlled by a movable valve member 96 loaded by a light spring 93'. Downstream of the valve member 96, the passage 95 continues at 95' into the discharge end of the master cylinder chamber 22. Compensating fluid in this instance is taken from the reservoir 57 by way of conduit 98. Should leakage in the brake motor system proper tend to produces a vacuum or subatmospheric pressure therein, the lightly loaded valve member 96 will open passage 95 and permit hydraulic fluid to flow into the brake lines 26. The system as a whole may be bled by backing off screw plug 99.

Operation of the device of the invention is as follows:

In the position of the parts as shown in FIGURES 1 and 2, the vehicle brakes are released and the system as a whole may be considered at rest. At such time, the power piston or diaphragm 11 is in its left-hand or retracted position, the master cylinder piston 34 is back or retracted to a point where the left-hand end is abutting the bushing 33 in which the connecting rod 30 has reciprocating movement. This has brought the left-hand or forked end of yoke 38 up against the said bushing and has caused the plunger 39 of the yoke to unseat the ball valve 48 from the seat 41'. With the ball valve 48 in its intermediate position clear of seat 41', the pressure in both the master cylinder 19 and master cylinder 55 will become substantially equalized and any excess fluid will be forced back into the reservoir 57. Power piston or diaphragm 11 will be "submerged" in vacuum, since the pressure in chamber 13 is communicated to chamber 12 by way of passage 71, chamber 67, valve seat 73, chamber 68 and hose connection 69, poppet valve 76 being open and 77 being closed.

During normal operation of the system, that is with power assistance available and a normal braking effort, movement of the brake pedal 56 in a direction to compress the fluid in the master cylinder 55 communicates hydraulic pressure to chamber 60 and thence to chamber 83 in which the piston 66 is mounted, whereupon the latter will move to the right and seat poppet valve 76 and unseat valve 77, thereby closing off chamber 12 from its vacuum source and communicating atmospheric pressure to said latter chamber by way of conduit 79, chambers 80 and 68 and hose connection 69. Immediately upon an increase of pressure in chamber 12, a differential force is developed across diaphragm 11, causing the latter and its connecting rod 30 to move to the right. As the connecting rod 30 moves to the right, it engages and drives the master cylinder piston 34 to the right, pressurizing fluid in chamber 22, brake lines 26 and motors or brake cylinders 27 and operating the brakes in a known manner.

When the connecting rod 30 is initially moved to the right, the reduced end thereof beyond the pin 45 thrusts against the plug 46 (the pin 45 having some slight play or tolerance), and as the master cylinder piston 34 is moved clear of the bushing 33, the unloader yoke 38 is released, permitting the differential across the ball valve 48 to immediately seat the latter on the seat 41', thereby effectively sealing the input side of the system from the output side during the power stroke.

Since the valve 92 and the return springs 29 will not permit displacement of fluid from master cylinder chamber 22 until a certain pressure has been developed therein, and since this pressure is greater than that required to operate the control valve 65 in time to start the power piston on its power stroke, there will be no displacement of fluid from the input side across the piston 34 just prior to the beginning of the power stroke and before valve member 48 seats at 41'.

The desired reaction pressure or "feel" is provided by the differential across the diaphragm 72 and piston 66, the latter reacting against the pressure developed in the master cylinder 55.

Assume a brake application where the brakes are applied suddenly and with great force. At this time the combination of orilfice 53 and valve 92 work together to prevent fluid being displaced across the master cylinder piston 34 and into the output side of the system before the power booster has time to act. That is as a result of a sudden application of the brake pedal 56 as aforementioned the power booster piston 11 and hence the master cylinder piston 34 momentarily lag displacement of fluid from chamber 60 so that the pressure in this chamber is communicated by way of slot 37 and bore 40 to the ball valve chamber 41, creating a differential force across the ball valve 48 which seats the latter at 51 and closes passage 52, whereupon displacement of fluid can occur only through the relatively small by-pass restriction 53. As soon as the power booster becomes effective to advance the master cylinder piston 34, the pressure developed in the master cylinder chamber 22 combined with the mechanical force of spring 49, builds up a differential across the ball valve 48 which moves it onto the seat 41'.

Should there be a power failure and the driver or operator of the vehicle resort to full manual braking, then upon depression of the brake pedal, the ball valve 48 may or may not seat at 51, depending upon the rapidity of displacement of fluid in the master cylinder. Should the ball valve seat at 51, it may remain seated only momentarily, since the pressure developed in the master cylinder chamber 22 combined with the mechanical force of spring 49 builds up a differential across the ball valve tending to unseat the latter and open the port or passage 52. Should displacement in the low input side of the system be such as to cause the brake pedal 56 to reach its limits of travel or become "bottomed," the operator of the vehicle need only "pump" the pedal to avail himself of the reserve fluid in the reservoir 57.

*Figure 4*

In FIGURE 4, an alternate type of master cylinder piston is shown wherein communication between the input and output systems is by way of a single restriction only. In this figure, parts which find their mechanical equivalents in the master cylinder piston of FIGURES 1, 2 and 3 are identified by similar reference numerals except that a prime (') has been added. In this instance, the piston is indicated at 100; it is formed with a bore 101, which terminates in a valve port 102, opening into a valve chamber 103. A ball valve 104 is loosely mounted in chamber 103 and is adapted to seat at 105 when the piston is moved to the right to displace fluid in the master cylinder 22. A light spring 106 serves to hold the ball valve in stable position in chamber 103.

An orifice plate 107, having a port or orifice 108, is removably fixed in an annular enlargement 109 of the chamber 103 by a split ring 110.

In the position of the parts as shown in FIGURE 4, the brakes are released and the booster or power cylinder piston is retracted. This has brought the piston 100 up against the bushing 33, the yoke unloader 38' having first engaged said bushing and moved the ball valve 104 off its seat 105. Fluid compensation for changes in volume of fluid in either or both sides of the system may now take place across the orifice 108. During normal braking operations, the pedal 56 is depressed and hydraulic fluid is displaced in the master cylinder 55, fluid pressure developed in the chamber 60 being transmitted through passage 82, FIGURE 1, to chamber 83 where it acts on the control valve piston 66, moving the latter to the right to in turn move the poppet valve seat 73 against valve 76 and valve 77 off seat 78, whereupon atmospheric pressure is communicated to power booster chamber 12 and the resultant differential across diaphragm 11 moves rod 30 to the right on its power stroke. Initial movement of rod 30 to the right moves piston 100 and unloader yoke 38' clear of the bushing 33, whereupon ball valve 104 seats at 105, closing off communication between the output and input systems across the piston 100 during the power stroke of the latter.

The orifice 108 is tailored to provide the proper pressure build-up in the chamber 60 to operate the control valve 65 before the pressure in bore 22 has become sufficient to unseat valve 92. The orifice 108 must also permit adequate flow through the piston 100 when it is necessary to apply the brakes manually in the event the power booster has been disabled.

It will be obvious to those skilled in the art that the objects of the invention may be attained by the use of constructions differing in certain respects from the illustrated embodiments without departing from the underlying principles of the invention.

I claim:

1. In a hydraulic braking system and the like: a driven fluid pressure motor; a first fluid pressurizing device; a second fluid pressurizing device having a fluid pressurizing chamber with a movable wall therein dividing said chamber into an output chamber and a follow-up chamber; the displacement of said follow-up chamber being less than that of said output chamber, said output chamber supplying fluid pressure to said driven fluid pressure motor; motor means for driving said movable wall into said output chamber to displace fluid therefrom; control means for said motor means, said control means being operated by expansible means; means for communicating fluid discharged from said first fluid pressurizing device to said expansible means, said follow-up chamber, and said driven fluid pressure motor; back pressure valve means operatively positioned between said first fluid pressurizing device and said driven fluid pressure motor for exerting a back pressure against said first fluid pressurizing device when fluid is initially discharged therefrom, said back pressure valve means in and of itself exerting a greater back pressure against said first fluid pressurizing device than does said expansible means of said control means during normal operation of the system, thereby assuring that the initial fluid displaced by said first fluid pressurizing device during normal operation of the system actuates said control means before fluid is displaced into said driven fluid pressure motor from said first fluid pressurizing device; a reservoir of compensating fluid; means communicating said reservoir to the portion of said system that is positioned between said back pressure valve means and said driven fluid pressure motor; and sensitive check valve means in said last mentioned means for preventing back flow into said reservoir, said check valve means opening under very little pressure differential to prevent the pressure in said driven fluid pressure motor from falling appreciably below that in said reservoir.

2. A braking system substantially as set forth in claim 1 characterized further in that the means communicating said first fluid pressurizing device to said driven fluid pressure motor has sufficient resistance to dynamic fluid flow to produce dynamic back pressure build-up against said control means which substantially offsets the dynamic resistance of said motor and its control means, to thereby assure that substantially none of the fluid from said first fluid pressurizing device is delivered to the driven fluid pressure motor during a quick power actuation of the system.

3. In a hydraulic braking system and the like: a driven fluid pressure motor; a first fluid pressurizing device; a second fluid pressurizing device having a fluid pressurizing chamber with a movable wall therein dividing said chamber into an output chamber and a follow-up chamber, the displacement of said follow-up chamber being less than that of said output chamber, said output chamber supplying fluid pressure to said driven fluid pressure motor; motor means for driving said movable wall into said output chamber to displace fluid therefrom; control means for said motor means, said control means being operated by expansible means; means communicating fluid discharge from said first fluid pressurizing device to said expansible means, said follow-up chamber, and said output chamber; back pressure check valve means operatively positioned between said first fluid pressurizing device and said driven fluid pressure motor and adjusted and arranged to develop a greater back pressure against said first fluid pressurizing device than is exerted by said expansible means of said control means, thereby assuring that the initial fluid displaced by said first fluid pressurizing device during normal operation of the system actuates said control means before said fluid is permitted to be displaced into the driven fluid pressure motor; a reservoir of compensating fluid for said first fluid pressurizing device; means also communicating said reservoir to the portion of said system between said back pressure check valve means and said driven fluid pressure motor; and sensitive check valve means in said last mentioned means for preventing back flow into said reservoir, said check valve means opening under very little pressure differential to normally maintain the portion of the system between said back pressure valve means and said driven motor at a pressure substantially equal to reservoir pressure when the system is de-energized.

4. A braking system substantially as set forth in claim 3 characterized further in that the means communicating said first fluid pressurizing device to said output chamber has sufficient resistance to dynamic fluid flow to produce dynamic back pressure build-up against said control means which substantially offsets the dynamic resistance of said motor and its control means, to thereby assure that substantially none of the fluid from said first fluid pressurizing device is delivered to the driven fluid pressure motor during a quick power actuation of the system.

5. In a hydraulic braking system and the like: a driven fluid pressure motor; a first fluid pressurizing device; a second fluid pressurizing device having a fluid pressurizing chamber with a movable wall therein dividing said chamber into an output chamber and a follow-up chamber, the displacement of said follow-up chamber being less than that of said output chamber, said output chamber supplying fluid pressure to said driven fluid pressure motor; motor means for driving said movable wall into said output chamber to displace fluid therefrom; control means for said motor means, said control means being operated by expansible means; first spring means biasing said expansible means to its collapsed condition, means communicating fluid discharged from said first fluid pressurizing device to said expansible means, said follow-up chamber, and said output chamber; back pressure check valve means operatively positioned between said first fluid pressurizing device and said driven fluid pressure motor to create a back pressure against said first fluid pressurizing device and said expansible means; second spring means biasing said back pressure valve closed with sufficient force and adjusted and arranged to cause a greater back pressure against said first fluid pressurizing device than is exerted by said first spring means through said expansible means of said control means, thereby causing the initial fluid displaced by said first fluid pressurizing device to normally actuate said control means before said fluid is permitted to be displaced into the driven fluid pressure motor, said means communicating said first fluid pressurizing device to said output chamber having sufficient resistance to dynamic fluid flow to produce dynamic back pressure build-up against said control means which substantially offsets the dynamic resistance of said motor and its control means to thereby assure that substantially none of the fluid from said first fluid pressurizing device is delivered to the driven fluid pressure motor during a quick power actuation of the system; a reservoir of compensating fluid; means communicating said reservoir to the portion of said system between said back pressure valve means and said driven fluid pressure motor; and sensitive check valve means in said last mentioned means for preventing back flow into said reservoir, said check valve means opening under very little pressure differential to normally maintain the portion of the system between said back pressure valve means and said driven motor at a pressure substantially equal to reservoir pressure when the system is de-energized.

6. In a hydraulic braking system and the like: a driven fluid pressure motor; a first fluid pressurizing device; a second fluid pressurizing device having a fluid pressurizing chamber with a movable wall therein dividing said chamber into an output chamber and a follow-up chamber, said movable wall having a retracted position from which it is moved to displace fluid from the output chamber and the displacement of said follow-up chamber being less than that of said output chamber, said output chamber supplying fluid pressure to said driven fluid pressure motor; motor means for driving said movable wall into said output chamber to displace fluid therefrom; control means for said motor means, said control means being operated by expansible means; means communicating fluid discharged from said first fluid pressurizing device to said expansible means, and said follow-up chamber; flow conducting means in said movable wall communicating said output chamber to said follow-up chamber, said flow conducting means having an enlarged chamber therein with a valve port at either end; valve means in said enlarged chamber for abutment with either of said valve ports, said valve means being held in a position intermediate said valve ports when said movable wall is in its retracted position; means causing said valve closure member to close off said valve port adjacent said follow-up chamber when said movable wall is moved out of its retracted position; and a flow restricting passageway between said enlarged chamber and said ouput chamber for providing restricted flow communication across said movable wall when said valve member is in abutment with the other of said valve ports; whereby said control means is caused to act with sufficient rapidity during actuation of the system to prevent an appreciable amount of fluid discharged from said first fluid pressurizing device from entering the driven fluid pressure motor.

7. A power driven secondary fluid pressure intensifying unit of the type intended to be controlled by a primary fluid pressurizing device and comprising: a housing having a fluid pressurizing chamber with an outlet therein, a movable wall in said fluid pressurizing chamber, a servomotor for driving said movable wall into said fluid pressurizing chamber to displace fluid out of said outlet, control means for said servomotor, said control means being actuated by expansible means subjected to pressure from an inlet port adapted to be connected to the primary fluid pressurizing device, first means biasing said expansible means to its servomotor de-energizing collapsed condition, flow communicating means communicating said inlet with said outlet to permit fluid that is supplied said inlet to flow to said outlet during power failure of said servomotor, a first check valve in said flow communicating means restricting flow in the direction from said outlet to said inlet, and a spring biasing said check valve closed with a force exerting a greater back pressure on said inlet than is created by said first means through said expansible means of said control means, said flow communicating means including a flow restriction therein for further increasing its back pressure on said inlet during sudden applications of pressure to said inlet to overcome dynamic resistance of said control means, said housing including a reservoir compensating port operatively positioned between said first check valve and said outlet port, and a second check valve in said reservoir compensating port preventing flow out of said port.

8. A power driven secondary fluid pressure intensifying unit of the type intended to be controlled by a primary fluid pressurizing device and comprising: a housing having a fluid pressurizing chamber with an outlet therein, a movable wall in said fluid pressurizing chamber, a servomotor for driving said movable wall into said fluid pressurizing chamber to displace fluid out of said outlet, control means for said servomotor, said control means being actuated by expansible means subjected to pressure from an inlet port adapted to be connected to the primary fluid pressurizing device, first means biasing said expansible means to its servomotor de-energizing collapsed condition, flow communicating means communicating said inlet with said outlet to permit fluid that is supplied said inlet to flow to said outlet during power failure of said servomotor, a first check valve in said flow communicating means restricting flow in the direction from said outlet to said inlet, and a spring biasing said check valve closed with a force exerting a greater back pressure on said inlet than is created by said expansible means of said control means, said flow communicating means including a flow restriction therein for further increasing its back pressure on said inlet during sudden applications of pressure to said inlet to overcome dynamic resistance of said control means, said housing including a reservoir compensating port operatively positioned between said first check valve and said outlet port, and a second check valve in said reservoir compensating port preventing flow out of said port.

9. A power driven secondary fluid pressure intensifying unit of the type intended to be controlled by a primary fluid pressurizing device and comprising: a housing having a fluid pressurizing chamber with an outlet therein, a movable wall in said fluid pressurizing chamber, a servomotor for driving said movable wall into said output chamber to displace fluid out of said outlet, control means for said servomotor, said control means being actuated by expansible means subjected to pressure from an inlet port adapted to be connected to the primary fluid pressurizing device, first means biasing said expansible means to its servomotor de-energizing collapsed condition, flow communicating means communicating said inlet with said outlet to permit fluid that is supplied said inlet to flow to said outlet during power failure of said servomotor, a first check valve in said flow communicating means restricting flow in the direction from said outlet to said inlet, and a spring biasing said first check valve closed with a force exerting a greater back pressure on said inlet than is created by said expansible means of said control means, said housing including a reservoir compensating port operatively positioned between said first check valve and said outlet port, and a second check valve in said reservoir compensating port preventing flow out of said port.

10. A power driven secondary fluid pressure intensifying unit of the type intended to be controlled by a primary fluid pressurizing device and comprising: a housing having a fluid pressurizing chamber with an outlet connection therein, a movable wall in said fluid pressurizing chamber, a servomotor for driving said movable wall into said fluid pressurizing chamber to displace fluid out of said outlet, control means for said servomotor, said control means being actuated by expansible means that is subjected to pressure from an inlet connection adapted to be connected to said primary fluid pressurizing device, first means biasing said expansible means to its servomotor de-energizing collapsed condition, flow communicating means communicating said inlet with said outlet to permit fluid that is supplied said inlet to flow to said outlet during power failure of said servomotor, a check valve in said flow communicating means restricting flow in the direction from said outlet to said inlet, spring biasing said check valve closed with a force exerting a greater back pressure on said inlet than is normally created by said expansible means of said control means, a compensating connection adapted to be connected to a supply of compensating fluid, and means communicating said compensating connection to said outlet connection during de-energized periods of said servomotor when the pressure in said outlet connection falls below that of said compensating connection and preventing flow from said outlet to said compensating connection during energized periods of said servomotor.

11. In a hydraulic braking system and the like: a driven fluid pressure motor; a first fluid pressurizing device; a second fluid pressurizing device having a fluid pressurizing chamber with a movable wall for forcing fluid under pressure to said driven fluid pressure motor; motor means for driving said movable wall to displace fluid out of said chamber; control means for said motor means, said control means being operated by expansible means; means communicating fluid discharged from said first fluid pressurizing device to said expansible means and said driven fluid pressure motor; back pressure valve means operatively positioned between said first fluid pressurizing device and said driven fluid pressure motor for exerting a back pressure against said first fluid pressurizing device when fluid is initially discharged therefrom under pressure, said back pressure valve exerting a greater back pressure against said first fluid pressurizing device than does said expansible means of said control means during normal operation of the system; a reservoir of compensating fluid; and means communicating said reservoir to said driven fluid pressure motor during de-energized periods of said motor means when the pressure in said driven fluid pressure motor falls below that in said reservoir.

References Cited in the file of this patent

UNITED STATES PATENTS

| | | |
|---|---|---|
| 2,217,461 | Weihe | Oct. 8, 1940 |
| 2,433,953 | Ingres | Jan. 6, 1948 |